United States Patent Office 3,251,902
Patented May 17, 1966

3,251,902
ISOPARAFFIN-OLEFIN ALKYLATION USING
CRYSTALLINE ZEOLITE CATALYST
William E. Garwood, Haddonfield, Wilbur K. Leaman, Medford Lakes, Claude G. Myers, Pitman, and Charles J. Plank, Woodbury, N.J., assignors to Socony Mobil Oil Company, Inc., a corporation of New York
No Drawing. Filed July 15, 1963, Ser. No. 295,202
18 Claims. (Cl. 260—683.64)

This invention relates to the alkylation of branched chain hydrocarbons in the presence of an alumino-silicate catalyst and in particular, alkylation of isoparaffinic hydrocarbons in the presence of an alumino-silicate catalyst having selective activity for different alkylation reactions.

This invention contemplates the alkylation of branched chain hydrocarbons in the presence of a catalyst prepared from synthetic and naturally occurring aluminosilicates having active sites within their ordered internal structures which provide selective activity for effecting alkylation with certain alkylating agents. These active sites are produced by exchanging the alumino-silicate with metal cations and/or hydrogen cations (H+) to partially or almost completely replace the exchangeable metal cations, such as those of the alkali metals, found within its ordered internal structure; preferably the alumino-silicate is exchanged so that a substantial proportion of active sites are acid (H+) sites. Furthermore, this invention is concerned with alterning the selective activity of the alumino-silicate catalyst so that this activity is tailored to the use of a particular alkylating agent. In addition, this invention is directed to the production of branched chain paraffins, such as 2,3-dimethyl butane by reacting isobutane with an alkylating agent such as ethylene or propylene in liquid or mixed vapor-liquid phases in the presence of the catalyst heretofore described.

It has been found that an alumino-silicate catalyst which has been base exchanged with metal cations or exchanged with hydrogen cations or both, so as to have acid sites within its ordered internal structure, has a selective activity for effecting alkylation of branched chain paraffins with different alkylating agents at low temperatures in both liquid and mixed liquid-vapor phases. The selective activity is dependent on a concentration of acid sites found within the alumino-silicate catalyst. These acid sites are believed to catalyze alkylation reactions by causing the paraffin, such as isobutane, to form an alkyl radical at each of the acid sites. This alkyl radical then reacts with the olefin and the acid site is regenerated in the process by the hydrogen displaced from the alkylated paraffins.

Advantageously, the concentration of acid sites may be increased or decreased to provide the degree of selective activity necessary for a particular alkylation reaction. That is to say, the use of certain alkylating agents requires a higher concentration of acid sites than others to effect alkylation of branched chain hydrocarbons. Such control in the activity of the catalyst may be effected by a variety of methods. The alumino-silicate can be exchanged with either metal or hydrogen cations, or a combinaton of the two, so that substantially all or only a portion of the exchangeable cations usually present within their ordered internal structure are replaced with the exchanging cations; the greater amount of cations being exchanged usually providing a larger concentration of acid sites.

Although the desired concentration of acid sites can be provided by directly exchanging hydrogen cations for the exchangeable cations in some of the alumino-silicates, certain alumino-silicates are not stable to such acid treatment after a portion of their exchangeable cations are removed or are not stable in the acid form. Advantageously, it has been found that certain polyvalent metal cations, base exchanged for the exchangeable cations, not only provide additional acid stability, but also increase the incident of acid sites within the alumino-silicates.

It will be appreciated that, if an acid stable aluminosilicate is employed, the hydrogen cation exchanged form of alumino-slicate alone is preferred and that the metal exchanged forms of other alumnio-silicates may also be effective as catalysts for this invention.

In accordance with this invention, the degree of selective activity of the catalyst for effecting certain alkylation reaction as indicated by its concentration of acid sites, may also be controlled by physically reducing the number of available acid sites within an exchanged aluminosilicate. This may be accomplished by steaming the exchanged alumnio-silicate catalyst under controlled conditions prior to its use in the process of this invention. It is believed that steaming reduces the number of acid sites which may be contacted by the reactants. In general, reduction of the concentration of acid sites is effected when the activity of the catalyst is found to promote a high level of side reactions such as polymerization of the alkylating agents or reaction products. These polymerization reactions reduce the amount of reactants available for the alkylation processes and also form accumulations of higher molecular weight residues within the pore structure of the alumino-silicate which appreciably shorten the active life of the catalyst.

Because of the selective activity exhibited by the alumino-silicate catalysts described heretofore, several different alkylating agents may be used in the alkylation processes of this invention. The preferred alkylating agents are olefins such as ethylene, propylene, dodecylene and the like (those containing from 2 to 12 carbon atoms being particularly suitable); alkyl halides, such as ethyl chloride, propyl bromide, and the like, and alcohols, i.e., methanol, ethanol, propanol, and the like; in general, the alkyl radical portion thereof may have from 1 to 20 carbon atoms. In addition, it will be appreciated that numerous other acyclic compounds may be employed as alkylating agents. A consideration for determining the applicability of such a compound is whether it has sufficient thermal stability to maintain its molecular identity at the operating conditions contemplated by the invention. Also the alkylating agent ideally should be chemically stable so that it will not immediately polymerize with itself or other reactants. For example, it has been found that if propylene is used as alkylating agent for isobutane with a catalyst having a high concentration of strong acid sites, substantially all of the reaction products may be olefinic or aromatic in nature, thus indicating that polymerization of the olefin is more pronounced than alkylation.

Advantageously, it has been found that in accordance with the process of this invention, polymerization and other side reactions of the alkylating agent can be further reduced by regulating the order of introducing the reactants into the reactor. Thus, the compound to be alkylated can be charged first and allowed to substantially saturate the catalyst before the alkylating agent is introduced into the reactor. In addition, it will be appreciated that when shutting down the reactor for regeneration of the catalyst or the like, the alkylating agent, particularly an olefin, should be purged from the reactor prior to stopping the entry of the compound to be alkylated.

The branched chain paraffinic compounds to be alkylated in accordance with this invention may contain from 4 to 20 carbon atoms. Those paraffins which have a greater number of branched chains are particularly effective for the alkylation conditions contemplated by the invention. It will be appreciated that because there are several isomers of the higher molecular weight paraffins, this process may be employed to alkylate a wide variety of physically different compounds.

Typical of the alumino-silicates employed in accordance with this invention are several alumino-silicates, both natural and synthetic, which have a defined pore size in excess of 7 A. and generally in the approximate range of 7 A. to 15 A. within an ordered internal structure. These alumino-silicates can be described as a three dimensional framework of $SiO_4$ and $AlO_4$ tetrahedra in which the tetrahedra are cross-linked by the sharing of oxygen atoms whereby the ratio of the total aluminum and silicon atoms to oxygen atoms is 1:2. In their hydrated form, the alumino-silicates may be represented by the formula:

$$M_{2/n}O:Al_2O_3:wSiO_2:yH_2O$$

wherein M is a cation which balances the electrovalence of the tetrahedra, $n$ represents the valence of the cation, $w$ the moles of $SiO_2$, and $y$ the moles of $H_2O$. The cation can be any or more of a number of metal ions depending on whether the alumino-silicate is synthesized or occurs naturally. Typical cations include sodium, lithium, potassium, calcium, etc. Although the proportions of inorganic oxides in the silicates and their spatial arrangement may vary, effecting distinct properties in the alumino-silicates, the two main characteristics of these materials is the presence in their molecular structure of at least 0.5 equivalent of an ion of positive valence per gram atom of aluminum, and an ability to undergo dehydration without substantially effecting the $SiO_4$ and $AlO_4$ framework.

One of the crystalline alumino-silicates utilized by the present invention is the synthetic faujasite designated as zeolite X, and is represented in terms of mole ratios of oxides as follows:

$$1.0 \pm 0.2 M_{2/n}O:Al_2O_3:2.5 \pm 0.5 SiO_2:YH_2O$$

wherein M is a cation having a valence of not more than 3, $n$ represents the valence of M, and $y$ is a value up to 8, depending on the identity of M and the degree of hydration of the crystal. The sodium form may be represented in terms of mole ratios of oxides as follows:

$$0.9Na_2O:Al_2O_3:2.5SiO_2:6.1H_2O$$

Zeolite X is commercially available in both the sodium and the calcium forms. It will be appreciated that the crystalline structure of zeolite X is different from most zeolites in that it can adsorb molecules with molecular diameters up to about 10 A.; such molecules including branched chain hydrocarbons, cyclic hydrocarbons, and some alkylated cyclic hydrocarbons.

Other alumino-silicates are contemplated as also being effective catalytic materials for the invention. Of these other alumino-silicates another synthetic faujasite having the same crystalline structure as zeolite X and designed as zeolite Y has been found to be active. Zeolite Y differs from zeolite X in that it contains more silica and less alumina. Consequently, due to its higher silica content this zeolite has more stability to the hydrogen ion than zeolite X.

Zeolite Y is represented in terms of mole ratios of oxides as follows:

$$0.9 \pm 0.2 Na_2O:Al_2O_3:WSiO_2:XH_2O$$

wherein W is a value greater than 3 up to about 5 and X may be a value up to about 9.

The selectivity of zeolite Y for larger molecules is appreciably the same as zeolite X because its pore size lies in the range of about 9 A. to about 10 A.

Representative of the naturally occurring alumino-silicates that may be used in the present alkylation process is a naturally occurring zeolite known as mordenite. This zeolite is an ordered crystalline structure having a ratio of silicon atoms to aluminum atoms of about 5 to 1. In its natural state, it usually appears as the sodium salt which is represented by the following formula:

$$Na_8(Al_2)_8(SiO_2)_{40}24H_2O$$

Mordenite differs from other known zeolites in that ordered crystalline structure is made up of chains of 5-membered rings of tetrahedra and its adsorbability suggests a parallel system of channels having free diameters on the order of 4 A. to 6.6 A., interconnected by smaller channels, parallel to another axis, on the order of 2.8 A. free diameters. As a result of this different crystalline framework, mordenite can adsorb simple cyclic hydrocarbons, but cannot accept the large molecules which will be adsorbed by zeolite X and zeolite Y. As a consequence of this smaller pore size it has been found that mordenite may be more rapidly deactivated than either zeolite X or zeolite Y at the operating conditions of the present process.

It will be appreciated that other alumino-silicates can be employed as catalysts for the alkylation processes of this invention. A criterion for each catalyst is that its ordered internal structure must have defined pore sizes of sufficient diameters to allow entry of the preselected reactants and the formation of the desired alkylation products. Furthermore, the alumino-silicate advantageously should have ordered internal structure capable of chemisorbing or ionically bonding additional metals or hydrogen ions within its pore structure so that its catalytic activity may be altered for a particular alkylation reaction. Among the naturally occurring crystalline alumino-silicates which may be employed are faujasite, heulandite, clinoptilolite, mordenite, and dachiardite. These silicates have been found to have the ability to adsorb hydrocarbons containing more than three carbon atoms within their internal structure.

One effective alumino-silicate catalyst contemplated herein is prepared from the sodium form of zeolite X as the result of a conventional treatment involving partial replacement of the sodium by contact with a fluid medium containing cations of at least one of the rare earth metals, followed by additional exchange wtih a fluid medium containing hydrogen ions or a compound convertible to the hydrogen ion such as ammonium chloride. Any medium which will ionize the cations without affecting the crystalline structure of the zeolite may be employed. (It will be understood that the ammonium radicals are converted to hydrogen cations by a conventional treatment of the exchanged zeolite X whereby ammonia is driven off from the exchanged zeolite material.) After such treatment the resulting exchanged product is water washed, dried, and dehydrated. The dehydration thereby produces the characteristic system of open pores, passages or cavities of crystalline alumino-silicates.

As a result of the above treatment the rare earth-acid exchanged alumino-silicate is an activated crystalline catalyst in which the molecular structure has been changed by having metallic rare earth cations and hydrogen cations chemisorbed or ionically bonded thereto. In addition, it will be understood that the pore size of the rare earth-acid exchanged alumino-silicate catalyst may vary from about 9 A. to about 10 A. in diameter.

Advantageously, the rare earth cations can be provided from the salt of a single metal or preferably mixture of metals such as a rare earth chloride or didymium chlorides. Such mixtures are usually introduced as a rare earth chloride solution which, as used herein, has reference to a mixture of rare earth chlorides consisting essentially of the chlorides of lanthanum, cerium, praseodymium, and neodymium, with minor amounts of samarium, gadolinium, and yttrium. This solution is commercially available and contains the chlorides of a rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, yttrium (as $Y_2O_3$) 0.2% by weight, and other rare earth oxides 0.8% by weight. Didymium chloride is also a mixture of rare earth chlorides, but having a low cerium content. It consists of the following rare earths determined as oxides; lanthanum, 45–46% by weight; cerium, 1–2% by weight; praseodymium, 9–10% by weight; neodymium, 32–33% by weight; samarium, 5–6% by weight; gadolinium 3–4% by weight; yttrium, 0.4% by weight; other rare earths 1–2% by weight. It is to be understood that other mixtures of rare earths are equally applicable in the instant invention.

It will be appreciated that zeolite X may also be base exchanged with the rare earth metal cations alone if so desired and that the resulting rare earth exchanged zeolite X will serve as an effective alkylation catalyst, the primary difference being that its concentration of acid sites will be lower than the above-described catalyst.

In accordance with this invention, the preferred catalyst for low temperature, high pressure alkylation is the rare earth-acid exchanged, crystalline, synthetic faujasite including both zeolite X and zeolite Y; but other aluminosilicates such as mordenite may be treated to become effective catalytic materials for the process of this invention.

Zeolite Y may be activated by the same base exchange techniques employed for the rare earth-acid exchanged zeolite X catalyst. In addition, it has been found that the exchange of rare earth metals for the sodium ions within zeolite Y produces a highly active catalyst. However, because of its high acid stability the preferred form of zeolite Y is prepared by partially replacing the sodium ion with hydrogen ions. This replacement may be accomplished by treatment with a fluid medium containing a hydrogen ion or an ion capable of conversion to a hydrogen ion. Inorganic and organic acids represent the source of hydrogen ions, whereas ammonium compounds are representative of the cations capable of conversion to hydrogen ions. It will be appreciated that the fluid medium may contain a hydrogen ion, an ammonium ion or a mixture thereof, in a pH range from about 1 to about 12.

Mordenite may be activated to serve as a catalyst for the instant invention by replacement of the sodium ion with the hydrogen ion. The necessary treatment is essentially the same procedure as that described above for the preparation of acid zeolite Y, except that a mineral acid such as HCl is used as a source of hydrogen ions. In general the mordenite is reduced to a fine powder (approximately passing the 200 mesh sieve and preferably passing 300 or 325-mesh sieves or finer) and then acid treated.

It will be appreciated that cations of polyvalent metals other than the rare earths having a valence of three or more may be employed to replace the exchangeable cations from the alumino-silicates to provide effective catalysts for this alkylation process. Exemplary of such metals are titanium, zirconium, aluminum, vanadium, chromium, manganese, iron, cobalt, and the like. However, the chemical properties of the metal, i.e., its atomic radius, degree of ionization, and the like will determine its suitability for exchange with a particular alumino-silicate.

In addition, certain divalent metal cations such as calcium, magnesium, and barium may be used with ammonium chloride or like ammonium compounds to produce the necessary acid sites within the alumino-silicate catalyst by conventional base exchange techniques; a portion of the acid sites being formed by heating the alumino-silicate to drive off ammonia.

In accordance with this invention, the unique activity of the alumino-silicate catalyst is also affected by the availability of the active sites within its ordered internal structure. It will be appreciated that the pore sizes of the catalysts determine whether a compound of specific molecular dimensions can contact the active sites by passing through its ordered internal structure. Accordingly, catalysts having larger pore size effectively promote alkylation for a greater range of different branched chain hydrocarbons. In addition, the rate of deactivation of the catalyst is substantially affected by the pore size. Apparently, larger pore sizes allow the reactants to pass more freely through the ordered internal structure; thereby facilitating shorter contact times which prevent product degradation. Furthermore, larger pore sizes accommodate greater accumulation of tarry residues before becoming blocked and deactivated. Accordingly, the alumino-silicates used to prepare the catalysts of this invention preferably have a pore size of from about 7 A. to about 13 A. in diameter.

Because the selective activity of the alumino-silicate catalyst of this invention is governed by the concentration of acid sites within its ordered internal structure as well as by the availability of these sites, it is desirable to forecast the activity level for a particular base exchanged alumino-silicate catalyst. Accordingly, a test method has been developed to measure the unique activity of these catalysts.

In conducting the test, n-hexane is fed to a reactor which contains a catalyst to be evaluated. The flow rate of the n-hexane, catalyst sample size and temperature in the reactor are preselected to obtain conversion levels which preferably fall in the range of 5 to 50 weight percent. The hexane is usually charged by vaporization from a temperature-regulated bath with an inert carrier gas such as helium. Under normal conditions the vapor feed will consist of about 20% n-hexane, 80% helium.

The hexane is fed to the reactor until the catalyst to to hexane ratio (volume basis) equals about 50. At this time a sample of the reaction products is taken and analyzed by gas chromatography.

The conversion of n-hexane determined from the chromatograph is converted to a reaction rate constant by the the assumption of a first order or psuedo-first order reaction. The value obtained is normalized by dividing by the reaction rate constant for conventional silica-alumina catalyst containing about 10 weight percent alumina and having a Cat-A activity of 46 as described in National Petroleum News 36, page P.R.–537 (August 2, 1944). Such catalyst is hereinafter designated as 46AI silica-alumina catalyst. This value is then corrected to 1000° F. by use of an Arrhenius plot if the evaluation occurred at some other temperature. Results are therefore reported as relative rate constants at 1000° F. and the term $\alpha$ has been assigned to this value. Thus by definition the 46AI silica-alumina catalyst has an activity constant of one $\alpha$.

The range of operating conditions for this test are as follows:

| | |
|---|---|
| Catalyst volume in reactor, cc. | 0.1 to 10 |
| n-Hexane flow rate, cc./hr. | 0.2 to 30 |
| Liquid hourly space velocity | 0.2 to 40 |
| Catalyst to hexane ratio | 2.0 to 200 |
| Temperature in reactor, °F. | 500 to 1000 |

However, normally test conditions remain fixed except for the temperature as shown below:

| | |
|---|---|
| Catalyst volume in reactor, cc. | 1.5 |
| n-Hexane flow rate, cc./hr. | 0.66 |
| Liquid hourly space velocity | 0.44 |
| Catalyst to hexane ratio | [1] 46 |

[1] For 5 minutes on stream.

The product sample is usually taken after 5 minutes on stream and passed into the chromatograph for analysis. Frequently another product sample is taken at a longer on stream time, say 30 minutes, and comparison of these two values gives a picture of the catalysts decline in activity with time or its aging rate. Times shorter than 5 minutes can be used but these sometimes give a false percent conversion value because an equilibrium state of desorption of products and unconverted hexane charge has not been reached.

By using the n-hexane test and assigning the 46AI silica-alumina catalyst an activity constant of one α, it has been found that the catalysts of this invention have activity constants of at least five α and may be as high as several thousand α. It will be appreciated that these high levels of activity can be regulated by the base exchange techniques used to prepare the catalyst as well as by physical treatment of the prepared catalyst such as calcination, steaming or incorporation into a less active support material.

The alumino-silicate catalyst may be employed directly as a catalyst or it may be combined with a suitable support or binder. The particular chemical composition of the latter is not critical. It is, however, necessary that the support or binder employed be thermally stable under the conditions at which the conversion reaction is carried out. Thus, it is contemplated that solid porous adsorbants, carriers and supports of the type heretofore employed in catalytic operations may feasibly be used in combination with the crystalline alumino-silicate. Such materials may be catalytically inert or may possess an intrinsic catalytic activity or an activity attributable to close association or reaction with the crystalline alumino-silicate. Such materials include by way of examples, dried inorganic oxide gels and gelatinous precipitates of alumina, silica, zirconia, magnesia, thoria, titania, boria and combinations of these oxides with one another and with other components. Other suitable supports include activated charcoal, mullite, kieselguhr, bauxite, silicon carbide, sintered alumina and various clays. These suported crystalline alumina-silicates may feasibly be prepared as described in copending application of Albert B. Schwartz, Serial No. 147,722, filed October 26, 1961, by growing crystals of the alumino-silicate in the pores of the support. Also, the alumino-silicate may be intimately composited with a suitable binder, such as inorganic oxide hydrogel or clay, for example, by ball milling the two materials together over an extended period of time, preferably in the presence of water, under conditions to reduce the particle size of the alumino-silicate to a weight mean particle diameter of less than 40 microns and preferably less than 15 microns. Also, the alumino-silicate may be combined with and distributed throughout a gel matrix by dispersing the alumino-silicate in powdered form in an inorganic oxide hydrosol. In accordance with this procedure, the finely divided alumino-silicate may be dispersed in an already prepared hydrosol or, as is preferable, where the hydrosol is characterized by a short time of gelation, the finely divided alumino-silicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time and the resulting hydrogel may thereafter, if desired, be exchanged to introduce selected ions into the alumino-silicate and then dried and calcined.

The inorganic oxide gel employed, as described above as a matrix for the metal alumino-silicate, may be a gel of any hydrous inorganic oxide, such as, for example, aluminous or siliceous gels. While alumina gel or silica gel may be utilized as a suitable matrix, it is perferred that the inorganic oxide gel employed be a cogel of silica and an oxide of at least one metal selected from the group consisting of metals of Groups IIA, IIIB, and IVA of the Periodic Table. Such components include for example, silica-alumina, silica-magnesia, silica-zirconia, silica-thoria, silica-beryllia, silica-titania as well as ternary combinations such as silica-alumina-thoria, silica-alumina-zirconia, silica-alumina-magnesia and silica-magnesia-zirconia. In the foregoing gels, silica is generally present as the major component and the other oxides of metals are present in minor proportion. Thus, the silica content of such gels is generally within the the approximate range of 55 to 100 weight percent with the metal oxide content ranging from zero to 45 weight percent. The inorganic oxide hydrogels utilized herein and hydrogels obtained therefrom may be prepared by any method well known in the art, such as, for example, hydrolysis of ethyl ortho-silicate, acidification of an alkali metal silicate and a salt of a metal, the oxide of which it is desired to cogel with silica, etc. The relative proportions of finely divided crystalline alumino-silicate and inorganic oxide gel matrix may vary widely with the crystalline alumino-silicate content ranging from about 2 to about 90 percent by weight and more usually, particularly where the composite is prepared in the form of beads, in the range of about 5 to about 50 percent by weight of the composite. It will be appreciated that base exchange of the metal, ammonium, or hydrogen cations to produce the necessary acid sites within the alumino-silicate may be carried out either before or after the alumino-silicate has been incorporated into the matrix binder material.

The catalyst of alumino-silicate employed in the process of this invention may be used in the form of small fragments of a size best suited for operation under the specific conditions existing. Thus, the catalyst may be in the form of a finely divided powder or may be in the form of pellets of 1/16" to 1/8" size, for example, obtained upon pelleting the alumino-silicate with a suitable binder such as clay. The zeolite X, described hereinabove, may be obtained on a clay-free basis or in the form of pellets in which clay is present as a binder.

It has also been found that the alkalation process of this invention may be carried out at less severe operating conditions thereby increasing catalyst life and avoiding frequent regeneration of the contaminated catalysts.

Advantageously, the temperature of this process may extend from room temperature to 600° F.; preferably the process is operating at temperatures from 50° to 300° F. The upper operating temperature limits have been found to be determined by the occurrence of undesirable side reaction which reduce the concentration of the reactants. Thus, at temperatures of about 500° F. polymerization of unsaturated hydrocarbons, such as olefins, greatly increases and causes deactivation of the alumino-silicate catalyst. At lower operating temperatures, i.e., below 50° F., the process produces low yields of the desired paraffinic compounds or requires extended periods for efficient conversion. It is believed that at these low temperatures the activity of the catalyst is reduced by the inability of the acid sites to form alkyl radicals from the alkylating agents.

The pressures contemplated by this invention may extend over a considerable range, i.e., from about atmospheric to about 5000 p.s.i.g. Preferably the pressure is sufficient to maintain at least one of the reactants or reaction products in a liquid phase. This liquid phase operation is believed to promote the length of catalyst activity by preventing the formation of olefinic polymers and by washing out other by-product high molecular weight compounds from the ordered internal structure of the catalyst caused by the above-mentioned side reactions. In addition, liquid phase operation promotes greater catalytic activity by increasing the residence time of the reactants within the catalyst structure. Thus, in accordance with this invention, it has been found that liquid phase operation is particularly desirable for alkylation reactions in which the unsteamed, highly active crystalline alumino-silicate catalysts are employed. Apparently, such operation allows these catalysts to exhibit greater selective activity for alkylation without promoting undesirable side reactions such as polymerization that may occur during vapor phase operation.

The amount of catalyst used may be varied over relatively wide limits because of the different degrees of selective activity that can be produced from the alumino-silicates. In general, the amount of catalyst as measured by the liquid hourly space velocity of the isoparaffins may be from about 0.1 to 10. It will be appreciated that the amount of catalyst selected for a particular reaction will be determined by several variables including the reactants involved, as well as the nature of the catalyst and the operating conditions to be used.

In accordance with the process of this invention, the relative molar ratios between the isoparaffins and the alkylating agents generally are on the order of about 3 to 1. However, higher molar ratios, e.g., about 12 to 1 may be desirable for certain reactions. In addition, stoichiometric proportions may also be employed. It will be appreciated that the specific molar ratio between the reactants is determined by the nature of the particular reactants, the operating conditions employed and the alumino-silicate catalyst being used.

It will be appreciated that, because of the selective activity shown by the alumino-silicate catalysts contemplated by the present invention, the alkylating agents may be employed in fluid media which contain major proportions of inert diluents. The advantages of such operation will readily be apparent because of the availability and low cost of obtaining such dilute process streams during hydrocarbon processing. In addition, by employing dilute olefin streams the formation of polymerized products within or on the order internal structure of the alumino-silicate catalysts is substantially reduced. As will be more fully amplified in the examples, the concentration of these fluid streams has a pronounced effect on the catalysts employed by the process.

It will be also appreciated that the operating conditions employed by the present invention will be dependent on the specific alkylation reaction being effected. Such conditions as temperature, pressure, space velocity and molar ratio of the reactants and the presence of inert diluents will have important effects on the process. Accordingly, the manner in which these conditions affect not only the conversion and distribution of the resulting alkylated products but also the rate of deactivation of the catalyst will be described below.

The process of this invention and the results obtained thereby may be more readily understood by reference to the following examples of specific alkylation reactions which are illustrative of the reactants, operating conditions, and catalyst employed herein.

The following examples were conducted as batch as well as continuous processes. Isobutane was used as the branched chain hydrocarbon to be alkylated, while ethylene and propylene were employed as the alkylating agents.

The catalyst for promoting this action was prepared by exchanging a 13X sodium alumino-silicate (a zeolite X having a pore size of about 9 A.) with rare earth and ammonium chlorides to partially replace the exchangeable sodium ions to a residual sodium content of less than about 3.5 weight percent and to form acid sites within the ordered internal structure of the zeolite X as heretofore described. Catalysts having particle sizes greater than 200 mesh and from 14–25 mesh were prepared. Some of these catalysts were further treated by drying in an autoclave at 900° F. and under a pressure of 2 mm. of mercury for one to two hours; resulting in a loss of about 0.3% in weight of the bound water molecules. In order to select the necessary degree of activity exhibited by this prepared catalyst, a portion of it was steamed for 24 hours at 1200° F. and at a pressure of 15 p.s.i.g. thereby reducing the concentration of acid sites to a desired level to provide a catalyst.

In addition other steamed catalysts were prepared from the crystalline sodium alumino-silicate zeolite X by base exchanging with a mixture of 5 percent by weight rare earth chlorides and a 2 percent by weight of ammonium chloride; followed by conventional drying and calcining of the exchanged product. This exchanged zeolite was steamed for 24 hours at 1200° F. under 15 p.s.i.g. pressure. Upon analysis, this catalyst was found to contain 0.31 weight percent sodium, 24.8 weight percent rare earth oxide. In addition, the catalyst had a surface area of 343 M.$^2$/grams. Another steamed catalyst was prepared in a similar manner except that 5 percent by weight of lanthanum chloride was substituted for the mixed rare earth chlorides. Analysis of this catalyst after steaming showed that it had a surface area of 393 M.$^2$/grams and contained 26.2 weight percent of rare earth oxide.

In the runs for the continuous alkylation of isobutane with ethylene, the reaction was conducted in a tubular reactor being heated by electrical resistance wire and containing 75 cc. of 14–25 mesh dried catalyst particles. Liquid isobutane was first introduced under pressure into the bottom of the reactor from a syringe pump so as to completely saturate and fill the catalyst. Then gaseous ethylene was metered from a lecture bottle through a calibrated monometer into the bottom of the reactor. The temperature of the continuous process was varied so that two runs were conducted in liquid phases and one run was in a mixed liquid-vapor phase. The reaction products were collected and analyzed after about 12 hours on stream.

During the batch alkylation of isobutane with either ethylene or propylene, the reactants together with the catalyst were charged into a closed heated autoclave. Pressure within the autoclave was maintained by autogenous generation. All the runs except one were conducted in a liquid phase; the exception being conducted above the critical temperature of the reactants so that they were in gas form. At periods of from 3 to 27 hours, the reactions were stopped, the autoclaves opened, and the reaction products analyzed. The catalysts for these reactions were selected from 200 mesh unsteamed, dried and undried catalysts as well as 14–25 mesh unsteamed and steamed catalysts.

Furthermore, to determine the effectiveness of the alumino-silicate catalyst for selectively promoting these alkylation reactions, the theoretical conversion of the olefin to corresponding paraffinic hydrocarbons having 5 or more carbon atoms ($C_5+$) was calculated for these reactions. This determination showed that 3.07 grams of the $C_5+$ liquid hydrocarbons ideally would be produced per gram of ethylene converted. A comparison of the yields actually achieved with this theoretical value was made for each of these runs.

In the continuous alkylation of isobutane with propylene under mixed liquid-vapor phase conditions the reactions were conducted in a metal pipe reactor (of approximately one inch inside diameter) containing a steamed catalyst. The reactor was heated with an electrical furnace. Isobutane and propylene were blended in a high pressure gas cylinder which then was inverted in a holding rack and connected to the reactor by pressurized sight-glass and a pump device. The blend of reactants was pumped continuously over the catalyst within the reactor and the resulting effluent was passed through a back pressure regulator into a gas-liquid separator. The liquid product from the separator was withdrawn at the end of each run and analyzed by a chromatographic column (15 feet in height, using 20 to 25 weight percent silicone oil on chromosorb at 72°).

*Example 1*

The selective activity exhibited by an unsteamed catalyst prepared from a rare earth-acid exchanged zeolite X for promoting alkylation reactions is exemplified by the following data for the continuous alkylation of isobutane with ethylene.

TABLE I.—CONTINUOUS ALKYLATION OF ISOBUTANE WITH ETHYLENE IN CONTACT WITH RARE EARTH-ACID EXCHANGED ZEOLITE X,[1] UPFLOW, 700 P.S.I.G. 4/1 MOLAR RATIO OF ISOBUTANE TO ETHYLENE

| | | | |
|---|---|---|---|
| Temperature, °F | 250 | 250 | 550 |
| Phase Condition | Liquid | Liquid | Mixed Vapor-Liquid |
| Time on Stream, Hours | 13 | 12 | 12 |
| Charge:[2] | | | |
| Catalyst, gm | 39.7 | 39.7 | 42.3 |
| Ethylene, gm | 36.8 | 34.5 | 36.7 |
| Isobutane, gm | 313.5 | 292.1 | 291.7 |
| Materials Recovery: | | | |
| Catalyst, gm | 45.1 | 43.5 | 49.8 |
| Ethylene, gm | 30.6 | 29.4 | 14.6 |
| $C_5+$Liquid, gm.[3] | 9.6 | 8.9 | 21.3 |
| Hydrocarbon, wt. percent [4] | 96 | 94 | 97 |
| Ethylene Reacted, wt. percent | 17 | 15 | 60 |
| Gm. $C_5+$Liquid Made/gm. | | | |
| $C_2H_4$ Converted | 1.6 | 1.7 | 1.0 |

[1] 75 cc., 14–25 mesh, pretreated in unit at 900° F. with nitrogen flow for 1–2 hours.
[2] Ethylene rate 32–35 vol. (60° F. gas)/vol. cat./hr.: isobutane rate 0.57–0.58 vol. (60° F. liquid)/vol. cat./hr. Reactor filled with isobutane before flow started.
[3] ±0.4 g.
[4] Includes weight gain of catalyst.

From the above data it will be seen that the yield of $C_5+$ hydrocarbons is above 50 percent for that theoretically obtainable when the process is operated at relatively low temperature (250° F.) and in the liquid phase. However, when the temperature was raised to 550° F., thereby causing the reactants to be in the gaseous phase, the yield of $C_5+$ liquid hydrocarbons per gram of ethylene converted dropped to about 33 percent. This reduction of alkylation, as evidenced by the increase in the amount of ethylene reacted (from 15 percent by weight to 60 percent by weight) is believed to be due to an increase in the polymerization reactions taking place within the reactor. In addition, the increase in weight of the catalyst when operating at 550° F. further indicates the increase in the accumulation of polymerization products within the ordered internal structure of the catalyst. It will be appreciated that this rapid increase (about 55 percent) of polymer build-up within the catalyst shortens the active life of the catalyst and causes more frequent regeneration.

Accordingly, the selective activity of the rare earth acid exchanged catalyst is more effective for alkylation of branched chain paraffins with the highly reactive olefins when operating below about 300° F. and with liquid phase operation.

*Example 2*

Control of the selective activity exhibited by the alumino-silicate catalyst having a high concentration of acid sites is further illustrated by the following comparison of the batch alkylation of isobutane with ethylene and with propylene using unsteamed and steamed catalysts respectively:

TABLE II.—BATCH ALKYLATION OF ISOBUTANE WITH ETHYLENE AND WITH [1] PROPYLENE OVER RARE EARTH-ACID EXCHANGED ZEOLITE X

Conditions:
Liquid Phase
Temperature, 250° F.
Autogenous Pressure
Time on Stream, 3 hours

| | Dried Catalysts [2] | |
|---|---|---|
| | Unsteamed | Steamed [3] |
| Charge: | | |
| Ethylene, gm | 27 | |
| Propylene, gm | 70 | 65 |
| Isobutane, gm | 170 | 170 | 170 |
| Catalyst, gm | 50 | 50 | 50 |
| Materials Recovery: | | |
| Catalyst, gm | 56 | 62 | 55 |
| Ethylene, gm | 21 | | |
| Propylene, gm | | 24 | 31 |
| $C_5+$Liquid, gm | 5.3 | 42.5 | 20.5 |
| Hydrocarbon, wt. percent [4] | 100 | 104 | 104 |
| Gm. $C_5+$Liquid Made/gm. | | | |
| Olefin Converted | 0.9 | 0.9 | 0.6 |
| Percent Olefins plus Aromatics in $C_5+$Liquid | Trace only | 100 | 35 |

[1] Catalyst made by exchange of rare-earth and ammonium chlorides with 13X sodium alumino-silicate.
[2] Drying was in the autoclave at 900° F. and 2 mm. Hg for 1–2 hours.
[3] Catalyst steamed for 24 hours at 1,200° F. and 15 p.s.i.g.
[4] Includes weight gain of catalyst.

These data show the pronounced selective activity achieved by altering the concentration of acid sites within the alumino-silicate catalysts. As evidenced by the percent of olefins and aromatics in the $C_5+$ liquid product, the unsteamed catalyst promoted alkylation of isobutane with ethylene in the liquid phase but failed to cause any appreciable alkylation with the use of propylene; 100 percent of the $C_5+$ hydrocarbons being either olefins or aromatic.

On the other hand, when the available concentration of acid sites was reduced by steaming the catalyst for 24 hours at 1200° F. and 15 p.s.i.g., 65 percent of the $C_5+$ liquid hydrocarbons produced by reaction of isobutane and propylene were alkylation products. In addition, the weight gain of catalyst which is an indication of the accumulation of polymerization products within its pore structure was about 55 percent less for the use of steamed catalyst. Therefore, it is apparent that the preferred catalysts of this invention as exemplified by the rare earth-acid exchange zeolite X have selective activity for effecting alkylation of branched chain hydrocarbons by keeping the polymerization side reactions to an acceptable level for different alkylating agents.

*Example 3*

The additional effects of physical treatment of the selective activity of the alumino-silicate catalyst are further exemplified by the following table.

TABLE III.—BATCH ALKYLATION OF ISOBUTANE WITH ETHYLENE OVER RARE-EARTH ACID EXCHANGED ZEOLITE X

[Conditions: Liquid Phase; Antogenous pressure]

| Catalyst: Mesh Size | >200 Mesh | | | | | | | 14-25 Mesh | |
|---|---|---|---|---|---|---|---|---|---|
| Pretreatment Steaming | Unsteamed | | | | | | | Unsteamed | Steamed |
| Drying | Dried | | | | Undried | | | Dried | Dried |
| Charge: | | | | | | | | | |
| Catalyst, gm | 50 | 100 | 50 | 50 | 50 | 50 | 50 | 50 | 50 |
| Ethylene, gm | 22 | 22 | 23 | 22 | 27 | 23 | 22 | 27 | 24 |
| i-Butane, gm | 170 | 170 | 170 | 170 | 175 | 170 | 170 | 170 | 170 |
| Water, gm | | | | | | | 1.5 | | |
| Temperature, °F | ¹300 | 250 | 250 | 250 | 250 | 250 | 150 | 250 | 250 |
| Time, hrs | 20.5 | 20.5 | 24 | 22 | 6 | 21 | 22 | 3 | 23 |
| Run No | 1 | 2 | 3 | 4 | 5 | 6 | 7 | 8 | 9 |
| Materials Recovery: | | | | | | | | | |
| Catalyst, gm | 55 | 107 | 54 | 56 | 60 | 57 | 55 | 56 | 58 |
| Ethylene, gm | 4 | 4 | 3 | 9 | 13.5 | 3 | 14 | 21 | 24 |
| C₅+Liquid, gm | 17.5 | 29 | 20.3 | 19 | 12.7 | 28.6 | 13 | 5.3 | 1.9 |
| Hydrocarbon, wt. percent | 99 | 100 | 104 | 100 | 98 | 107 | 103 | 100 | 108 |
| gm. C₅+Liquid Made/gm. C₂H₄ Converted | 0.97 | 1.45 | 0.99 | 1.46 | 0.94 | 1.43 | 1.62 | 0.89 | |

¹ This run is conducted in a mixed vapor liquid phase because it was above the critical temp. of the hydrocarbon charge (but not of products).

Review of Table III shows that finely divided unsteamed alumino-silicate catalysts are most effective for the batch process of alkylating isobutane with ethylene. Furthermore, as shown by Run No. 6 the presence of a small amount of water appears to further promote the activity of the catalyst. It is believed that controlled amounts of water may increase the hydrolysis effects necessary for the polyvalent metals to form acid sites within the alumino-silicate catalyst. Also of interest is the effect of the extent of steaming on the selective activity of catalyst for alkylation with ethylene. During liquid phase operation, extended steam treatment is apparently unnecessary because it may so alter the availability of the acid sites that the activity of the catalyst for alkylation is reduced. Thus, it will be appreciated that less severe steaming may be efficiently used to regulate the activity of the catalyst depending upon the reaction conditions and the extent of alkylation desired. Another point to note is that in this liquid phase operation activity of the catalyst is not reduced after extended periods of operation. These data indicates that liquid phase operation reduces polymerization to avoid undue accumulation of tarry residues with the catalyst.

*Example 4*

This example is an extension of Runs Nos. 6 and 8 of the above example showing the alkylate composition.

TABLE IV.—LIQUID COMPOSITION OF HYDROCARBONS HAVING FIVE OR MORE CARBON ATOMS

| | | Run No. 6 | Run No. 8 |
|---|---|---|---|
| C₅ | i-pentane | 43 | 27 |
| | n-pentane | 2 | |
| | Cyclopentane | <1 | |
| C₆ | 2,2-dimethylbutane | <1 | <1 |
| | 2,3-dimethylbutane | 13 | 50 |
| | 2-methylpentane | 9 | 2 |
| | 3-methylpentane | 6 | 10 |
| | n-hexane | <1 | |
| C₇ | 2,4-dimethylpentane | 2 | <1 |
| | 2,3-dimethylpentane | 4 | <1 |
| | 2-methylhexane | | |
| | 3-methylhexane | 2 | |
| C₈ | 2,2,4-trimethylpentane | 4 | 3 |
| | Other C₇+Liquid | 15 | 7 |

This analysis of alkylate composition indicates that the primary alkylation product is 2,3-dimethylbutane (Run No. 8, 3 hours). When reaction time is long enough (Run No. 6, 21 hours) secondary reactions such as isomerization and cracking occur to a greater extent.

*Example 5*

Runs similar to the first three runs of Example 3 were conducted in the presence of a number of other solid catalysts including amorphous silica-alumina (46AI), the non-exchanged sodium form of zeolite X, the calcium form of zeolite X and a rare earth exchanged catalyst prepared from a zeolite having a pore size less than 6 A. (a Linde zeolite A), and all were found inactive.

*Example 6*

57.8 grams of the rare earth-hydrogen exchanged zeolite X (prepared from the mixture of 5 percent solution of rare earth exchanged chlorides and 2 percent ammonium chlorides) was placed in the metal pipe reactor and raised to a temperature of 400° F. Then an 8:1 weight ratio blend of isobutane and propylene (prepared by mixing 21.75 pounds of isobutane with 3.25 pounds of propylene) was pumped into the reactor from the high pressure cylinder at a liquid hourly space velocity of 1. The pressure of the unit was allowed to build up and then maintained at 300 p.s.i.g. After continuous operation for two hours in this mixed liquid-vapor phase, 3 grams of liquid product were collected, during which time 10.2 grams of propylene were charged. As shown in the following data, analysis of the liquid product by a chromatographic column gives significant yields of the alkylated product:

| | Grams |
|---|---|
| Isohexanes | 0.47 |
| Isoheptanes ¹ | 0.87 |
| Isooctanes | 0.26 |
| Total alkylate | 1.60 |

¹ Mixture of 2,3-dimethylpentane, 2,4-dimethylpentane, and methylhexane.

Inspection of the above data discloses that a yield of about 15.7 percent total alkylate (based on the olefin charge) was obtained over the two-hour period. Moreover, it will be appreciated that the isoheptanes apparently are formed by direct alkylation resulting from the combination of the isobutane and the propylene. It is believed that the isohexanes result from hydrogen transfer from the isobutane to dimers of propylene, whereas isobutene formed by hydrogen transfer to propylene or its dimers alkylates with isobutane to produce the secondary alkylate isooctanes. Irrespective of the theory used to describe the reaction mechanisms, it will be apppreciated that the present process provides useful alkylate products. In addition, these data illustrate how the activity of the catalyst may be modified by steaming to effectively alkylate with propylene at mixed liquid-vapor phase conditions and reduce undesirable side reactions such as polymerization.

*Example 7*

34.5 grams of the described lanthanum acid exchanged zeolite X was placed in the metal pipe reactor and its temperature raised to 400° F. The 8:1 weight ratio of isobutane and propylene used in the previous example was pumped into the reactor at a liquid hourly space velocity of 1.2. After the pressure in the reactor had reached and was maintained at 300 p.s.i.g., the run was continued for five hours. During this time 15.29 grams of propylene were introduced into the reactor and 5.1 grams of liquid product were collected. An analysis of the liquid product showed that it contained the following alkylation products:

| | Grams |
|---|---|
| Isohexanes | 0.68 |
| Isoheptanes | 1.31 |
| Isooctanes | 0.36 |
| Total alkylate | 2.35 |

Calculations from these data show that the steamed catalyst produced a yield of 15.4 percent total alkylate based on the olefin charge. The isoheptanes produced were approximately 56 percent of this total. Thus, it will be seen that the activity of the steamed catalyst is effective over extended periods of mixed liquid-vapor phase operation and that the activity of the alumino-silicate catalysts may be modified to suit particular combinations of isoparaffins and alkylating agents.

It will be appreciated that the examples set forth above, as well as the foregoing specification, are merely illustrative of the different branched chain hydrocarbon compounds which may be alkylated in accordance with the present invention and that other such organic compounds can be alkylated in accordance with the process of this invention.

It will further be appreciated that the selective activity of the alumino-silicate catalysts as exemplified by the above alkylation reactions using olefins may be modified for other alkylating agents such as the alkyl halides, alcohols, and the like.

It will also be appreciated that the operating conditions for the alkylation reaction in accordance with the process of this invention, as exemplified in the foregoing examples, may be varied so that the process can be conducted in gaseous phase, liquid phase, or mixed liquid-vapor phase, depending on product distribution, degree of alkylation, rate of catalyst deactivation and operating pressures and temperatures, and that various modifications and alternations may be made in the process of this invention without departing from the spirit of the invention.

What is claimed is:

1. A process for alkylating branched chain hydrocarbons which comprises effecting reaction of a branched chain paraffin selected from the group consisting of isobutane and isopentane with an olefin containing from 2 to 5 carbon atoms at from about room temperature to about 600° F. and at a pressure varying from atmospheric to about 5000 p.s.i.g. in contact with a catalyst comprising a crystalline alumino-silicate having selective activity for effecting alkylation with said olefin; said crystalline alumino-silicate having uniform pore openings of at least 7 Angstrom units and an activity constant of at least $5\alpha$.

2. The process of claim 1 in which said alumino-silicate catalyst consists essentially of a rare earth-acid faujasite.

3. The process of claim 1 in which said alumino-silicate catalyst consists essentially of a steamed rare earth-acid faujasite.

4. The process of claim 1 in which the temperature is between about 50° F. and 300° F.

5. The process of claim 1 in which alumino-silicate catalyst contains cations selected from the groups consisting of polyvalent metals having a valence of at least 2, hydrogen, ammonium, and combinations thereof.

6. The process of claim 1 in which said alumino-silicate catalyst contains cations of the rare-earth metals.

7. A process of claim 1 in which said alumino-silicate catalyst is selected from the group consisting of rare earth-acid exchanged zeolite X, rare earth exchanged zeolite X, rare earth exchanged zeolite Y, rare earth-acid zeolite Y, and acid zeolite Y.

8. The process of claim 1 in which the alumino-silicate is contained in and distributed throughout a matrix.

9. The process of claim 1 in which the reaction is conducted under sufficient pressure to maintain at least one of the reactants in a liquid phase.

10. The process of claim 1 in which the isoparaffins are allowed to saturate the catalyst before the olefin is in the presence of said catalyst.

11. The process of claim 1 in which the molar ratio between the paraffinic compound and the olefin extends from about 3:1 to about 12:1.

12. The process for producing 2,3-dimethylbutane which comprises effecting reaction of isobutane and ethylene from room temperature to about 600° F. and at a pressure sufficient to maintain isobutane in the liquid phase in contact with a catalyst consisting essentially of a rare earth-acid exchanged zeolite X having a selective activity for effecting alkylation with ethylene and recovering the 2,3-dimethylbutane product.

13. The process of claim 12 in which the catalyst is substantially saturated with isobutane before the ethylene is in the presence of said catalyst.

14. The process of claim 12 in which the ethylene is in a fluid medium containing a major proportion of an inert diluent.

15. A process for producing liquid paraffins having at least five carbon atoms which comprises effecting reaction of isobutane and propylene from room temperature to about 600° F. and in contact with a catalyst consisting essentially of a rare earth-acid exchanged zeolite X having a selective activity for alkylation with propylene, and recovering a paraffin product.

16. The process of claim 15 in which the catalyst is prepared from a zeolite X having a pore size of 13 A. which has been exchanged with rare earth and ammonium chlorides to produce a high concentration of acid sites within its ordered internal structure by steaming for 24 hours at 1200° F. and 15 p.s.i.g.

17. The process of claim 15 in which the catalyst is prepared from a zeolite X having a pore size of 13 A. which has been exchanged with lanthanum and ammonium chlorides to produce a high concentration of acid sites within its ordered internal structure by steaming for 24 hours at 1200° F. and 15 p.s.i.g.

18. The process of claim 15 in which the reaction is conducted in a mixed liquid-vapor phase.

References Cited by the Examiner

UNITED STATES PATENTS

| 2,971,903 | 2/1961 | Kimberlin et al. | 208—119 |
| 2,971,904 | 2/1961 | Gladrow et al. | 208—135 |
| 3,033,778 | 5/1962 | Frilette | 208—120 |
| 3,140,253 | 7/1964 | Plank et al. | 208—120 |
| 3,210,267 | 10/1965 | Plank et al. | 208—120 |

FOREIGN PATENTS

| 777,233 | 6/1957 | Great Britain. |
| 918,967 | 2/1963 | Great Britain. |

DELBERT E. GANTZ, *Primary Examiner.*

ALPHONSO D. SULLIVAN, JOSEPH R. LIBERMAN, *Examiners.*

C. R. DAVIS, R. H. SHUBERT, *Assistant Examiners.*